US009439089B2

United States Patent
Deshpande et al.

(10) Patent No.: US 9,439,089 B2
(45) Date of Patent: Sep. 6, 2016

(54) DEVICE TO DEVICE ROUND-TRIP TIME (RTT) MEASUREMENT VIA NEIGHBOR AWARE NETWORK

(71) Applicant: Google Inc., Mountain View, CA (US)

(72) Inventors: Vinit Chandrakant Deshpande, Cupertino, CA (US); Prem Kumar, Saratoga, CA (US); Mohammed Waleed Kadous, Santa Clara, CA (US); Wei Wang, San Carlos, CA (US); Meghan Desai, San Francisco, CA (US); Pierre Vandwalle, San Francisco, CA (US)

(73) Assignee: Google Inc., Mountain View, CA (US)

( * ) Notice: Subject to any disclaimer, the term of this patent is extended or adjusted under 35 U.S.C. 154(b) by 228 days.

(21) Appl. No.: 14/286,790

(22) Filed: May 23, 2014

(65) Prior Publication Data

US 2015/0341811 A1 Nov. 26, 2015

(51) Int. Cl.
*H04W 24/02* (2009.01)
*H04W 24/08* (2009.01)

(52) U.S. Cl.
CPC .............. *H04W 24/08* (2013.01); *H04W 24/02* (2013.01)

(58) Field of Classification Search
None
See application file for complete search history.

(56) References Cited

U.S. PATENT DOCUMENTS

| | | | | |
|---|---|---|---|---|
| 9,143,979 | B1* | 9/2015 | Lambert | H04W 28/0289 |
| 2014/0082185 | A1* | 3/2014 | Abraham | H04W 24/00 709/224 |
| 2014/0153444 | A1* | 6/2014 | Zhou | H04W 40/12 370/256 |
| 2014/0211659 | A1* | 7/2014 | Abraham | H04W 52/0209 370/254 |
| 2014/0301295 | A1* | 10/2014 | Abraham | H04W 28/044 370/329 |
| 2015/0139213 | A1* | 5/2015 | Abraham | H04L 69/28 370/338 |

OTHER PUBLICATIONS

Wi-Fi ALliance Technical Task Group, Wi-Fi Neighbor Awareness Networking (NAN), Wi-Fi NAN Technical Specification Contribution, Jan. 25, 2014 (draft), available at http://www.wi-fi.org.

* cited by examiner

*Primary Examiner* — Gregory Sefcheck
*Assistant Examiner* — Jenkey Van
(74) *Attorney, Agent, or Firm* — McDonnell Boehnen Hulbert & Berghoff LLP (57) ABSTRACT

Methods and systems for performing a round trip time determination between two devices are described. An example method may include publishing, over a wireless network interface by a first device within a neighbor aware network (NAN) cluster, a schedule that invites devices within the NAN cluster to request, within a time window, to perform a round trip time (RTT) determination with the first device. The schedule may indicate that the time window begins at a time offset from a NAN discovery window and ends after a predetermined period of time has elapsed. The method may also include receiving a request, from a second device within the NAN cluster, to perform the RTT determination with the first device. The method may also include performing the RTT determination with the second device.

17 Claims, 9 Drawing Sheets

DEVICE TO DEVICE ROUND-TRIP TIME (RTT) MEASUREMENT VIA NEIGHBOR AWARE NETWORK

BACKGROUND

Unless otherwise indicated herein, the materials described in this section are not prior art to the claims in this application and are not admitted to be prior art by inclusion in this section.

In telecommunications, the round-trip time refers to the duration of time elapsed between sending a signal to a destination and receiving an acknowledgment of the signal from the destination. In the context of computer networks, round-trip-time is often referred to as the ping time and may involve sending and receiving data packets. Various techniques for measuring round trip time between Wi-Fi (IEEE 802.11) enabled devices (known as stations, or STAs) have been proposed. However, obtaining accurate round-trip time between stations is non-trivial and may necessitate a combination of a highly accurate clock on each station and significant signal processing. Further, some techniques necessitate each station to be awake and listening on the same channel, which is not always the case. At the same time, accurate round-trip times may have a variety of applications, such as enabling indoor location determinations.

Neighbor Aware Networking is a Wi-Fi standard that enables NAN devices (a station configured to operate in a particular manner) to connect directly. Many conventional Wi-Fi networks operate using a controller device known as a wireless access point that provides for, among other functions, communication between stations. Unlike these conventional networks, NAN devices form a NAN network without the use of a wireless access point. NAN provides a mechanism on which NAN devices may converge to facilitate the discovery of services and devices within the NAN network.

SUMMARY

In one example, a method is provided that includes publishing, over a wireless network interface by a first device within a neighbor aware network (NAN) cluster, a schedule that invites devices within the NAN cluster to request, within a time window, to perform a round trip time determination with the first device. The schedule indicates that the time window begins at a time offset from a NAN discovery window and ends after a predetermined period of time has elapsed. The method further includes receiving a request, within the time window from a second device within the NAN cluster, to perform the RTT determination with the first device. The method further includes performing the RTT determination with the second device.

In another example, a computer readable storage memory having stored therein instructions, that when executed by a processor, cause the processor to perform functions is provided. The functions comprise publishing, over a wireless network interface by a first device, a schedule that invites devices receiving the schedule to request, within a time window, to perform a round trip time determination with the first device. The schedule indicates that the time window begins at a particular time and ends after a predetermined period of time has elapsed. The functions also comprise receiving a request, from a second device, to perform the RTT determination with the first device. The functions further comprise performing, within the time window, the RTT determination with the second device.

In still another example, a device is provided that comprises a wireless local area network (WLAN) interface, one or more processors, and data storage configured to store instructions, that when executed by the one or more processors, cause the system to perform functions. The functions comprise sending, over the WLAN interface to one or more devices within a neighbor aware network (NAN) cluster, a schedule that invites devices within the NAN cluster to request, within a time window, to perform a round trip time (RTT) determination with the first device. The schedule indicates that the time window begins at a time offset from a NAN discovery window and ends after a predetermined period of time has elapsed. The functions also comprise receiving, from at least one of the one or more devices, a request to perform a respective RTT determination with the first device. The functions further comprise performing RTT determinations with the at least one of the one or more devices.

In yet another example, a system is provided that includes a means for publishing, over a wireless network interface by a first device within a neighbor aware network (NAN) cluster, a schedule that invites devices within the NAN cluster to request, within a time window, to perform a round trip time (RTT) determination with the first device, where the schedule indicates that the time window begins at a time offset from a NAN discovery window and ends after a predetermined period of time has elapsed. The system further includes a means for receiving a request, within the time window from a second device within the NAN cluster, to perform the RTT determination with the first device. The system further includes a means for performing the RTT determination with the second device.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a first device in a neighbor aware network (NAN) cluster may be configured to perform a round trip time (RTT) determination with one or more other devices that are also in the NAN cluster. Features of Neighbor Aware Networking (also NAN) may assist in synchronizing devices with the NAN cluster, which may, in some circumstances, improve accuracy and/or reliability of RTT determinations. For instance, the NAN cluster may synchronize NAN devices within the cluster to a common clock or timer. The NAN cluster may also define a time period (e.g. a NAN Discovery Window) in which devices may converge on the same channel and communicate with one another.

In some examples, the first device may publish, over a wireless network interface, a schedule that invites devices within the NAN cluster to perform a RTT determination with the first device. The schedule may indicate a certain time window in which the devices may perform the RTT determination with the first device. The schedule may further indicate that the time window begins at a time offset from a NAN discovery window and ends after a period of time has expired. The first device may then receive a request, from a second device within the NAN cluster, to perform the RTT determination with the first device. After receiving the request, the first device may perform the RTT determination with the second device.

Performing the RTT determination may then involve time-stamping messages exchanged between the first device and the second device. For instance, the first device may generate, based on the common clock of the NAN cluster, a first time stamp that indicates the time at which an echo request message was sent to the second device. Then, when the first device receives an echo message from the second device, it may generate a second time stamp based on the common clock. The first device may then determine the RTT between the first device and the second device based on the difference between the second time stamp and the first time stamp.

Figure 1:
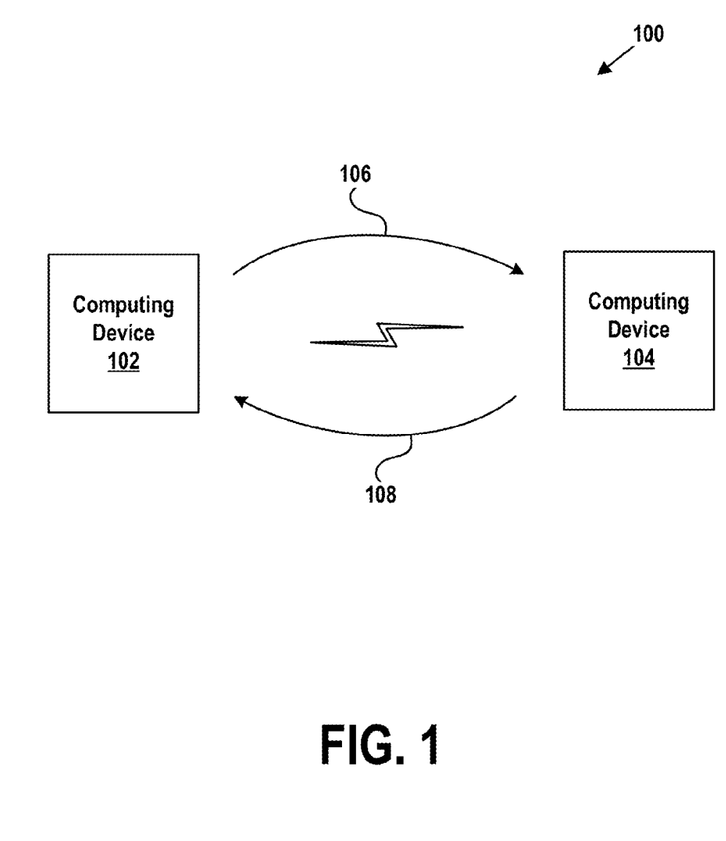
FIG. 1 illustrates an example communication system by which an example method may be implemented.

Referring now to the figures, FIG. 1 illustrates an example communication system 100 by which an example method may be implemented. The system 100 includes a first computing device 102 that may communicate with a second computing device 104 via one or more wired and/or wireless interfaces. The first computing device 102 and the second computing device 104 may communicate within a network. Alternatively, the computing device 102 and the server 104 may each reside within a respective network.

Computing device 102 may be any type of computing device or transmitter including a laptop computer, a mobile telephone, or tablet computing device, etc., that is configured to transmit data 106 to, or receive data 108 from, the computing device 104 in accordance with the method and functions described herein. Computing device 102 may include a user interface, a communication interface, a processor, and data storage comprising instructions executable by the processor for carrying out one or more functions relating to the data sent to, or received by, computing device 104. The user interface may include buttons, a touchscreen, a microphone, and/or any other elements for receiving inputs, as well as a speaker, one or more displays, and/or any other elements for communicating outputs.

Computing device 104 may be any entity or computing device arranged to carry out the method and computing device functions described herein. Computing device 104 may include the same components as computing device 102. Further, the server computing device 104 may be configured to send data 108 to or receive data 106 from the computing device 102.

The data 106 received by computing device 104 from computing device 102 may take various forms. For example, computing device 102 may provide an echo request message. Computing device 104 may then receive the echo request message.

The data 108 sent to computing device 102 from computing device 104 may take various forms. For example, computing device 104 may send to computing device 102 an echo message. Additionally, computing device 104 may send to computing device 102 a request to perform a round trip time determination.

Figure 2:
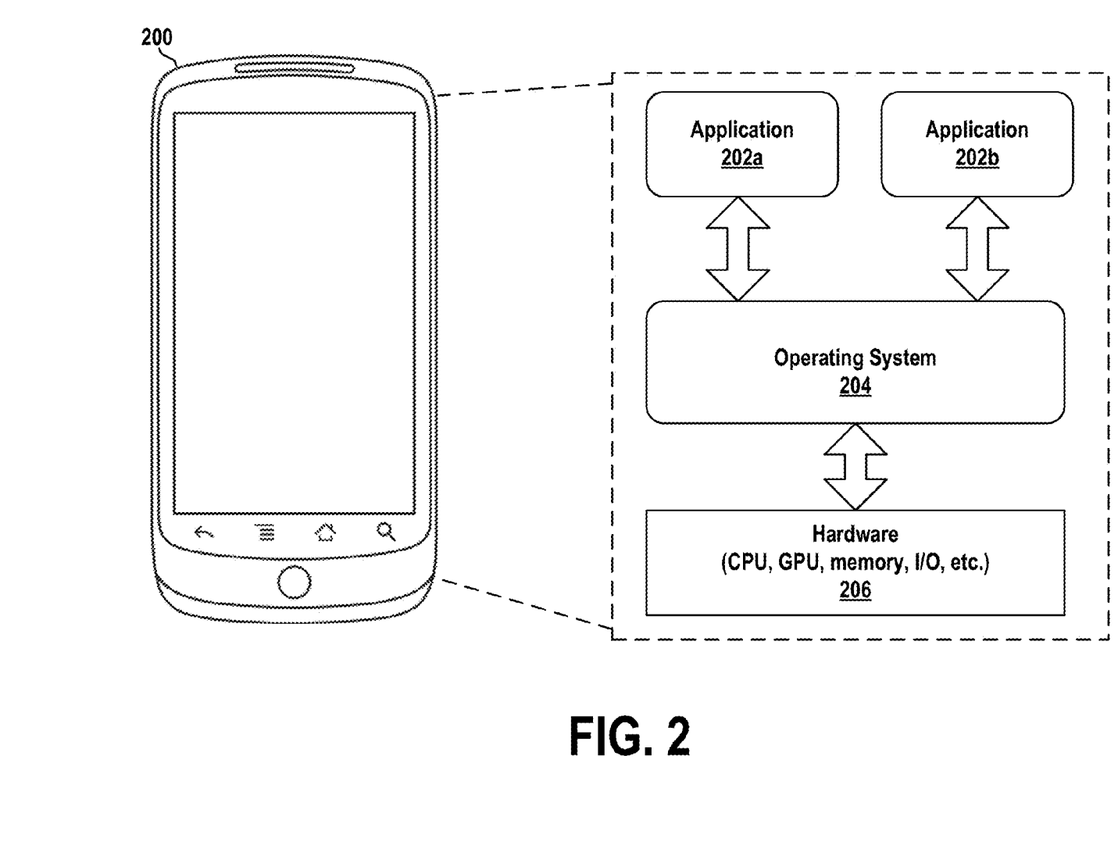
FIG. 2 illustrates an example computing device by which an example method may be implemented.

FIG. 2 illustrates an example computing device 200 by which an example method may be implemented. Computing device 200 may include applications 202a and 202b and an operating system 204 being executed by hardware 206. Although the example computing device 200 is a smartphone, aspects of this disclosure are applicable to other computing devices such as PCs, laptops, tablet computers, etc.

Each of the applications 202a and 202b may include instructions that when executed cause the computing device 200 to perform specific tasks or functions. Applications 202a and 202b may be native applications (i.e., installed by a manufacturer of the computing device 200 and/or a manufacturer of the operating system 204) or may be a third-party application installed by a user of the computing device 200 after purchasing the computing device. A non-exhaustive list of example applications includes: a media player application that accepts media files as inputs and generates corresponding video and/or audio to the output device(s); an e-reader application which accepts electronic documents (books, magazines, etc.) as input and presents the content of the document via the output device(s); a feed reader that accepts feeds delivered over the Internet (e.g., RSS feeds and/or feeds from social network sites) as input and presents the feeds via the output device(s); a map application that displays a map via the output device(s); a note-taking application, a bookmarking application, and a word processing, spreadsheet, and/or presentation application that accepts specifically formatted files as inputs and presents them via the output devices for viewing and/or editing.

The operating system 204 may interact with and manage hardware 206 to provide services for the applications 202a and 202b. For example, an application 202a may request that the operating system 204 direct an integrated camera of hardware 206 to capture a visual image and that the hardware 206 store the image to memory.

The hardware 206 may include, for example, a central processing unit (CPU), a graphics processor (GPU), memory, an input/output (I/O) interface, user input device(s), and output device(s). Components of hardware 206 may be controlled by instructions contained in applications 202a and 202b and operating system 204.

The central processing unit (CPU) may be operable to effectuate the operation of the computing device 200 by executing instructions stored in memory or disk storage. Such instructions may include the operating system 204 and the applications 202*a* and 202*b*. The CPU may, for example, comprise a single or multi-core processor, an application specific integrated circuit (ASIC), field programmable gate array (FPGA), and/or any other suitable circuitry.

The graphics processor may be operable to generate a video stream for output to the screen based on instructions and/or data received from the CPU. That is, data structures corresponding to images to be displayed on the screen may be stored to and read from the memory or disk storage by the CPU. The CPU may convey such data structures to the graphics processor via a standardized application programming interface (API) such as, for example, Standard Widget Toolkit (SWT), the DirectX Video Acceleration API, the Video Decode Acceleration Framework API, or other suitable API.

The memory may include program memory and run-time memory. The memory may, for example, comprise non-volatile memory, volatile memory, read only memory (ROM), random access memory (RAM), flash memory, magnetic storage, and/or any other suitable memory. Program memory may store instructions executable by the CPU to effectuate operation of the operating system 204 and the applications 202*a* and 202*b*. Runtime memory may store data generated or used during execution of the operating system 204 or applications 202*a* and 202*b*.

The input/output (I/O) interface may be operable to receive signals from the input device(s), and provide corresponding signals to the CPU and/or the graphics processor.

The input device(s) may include, for example, a mouse, a touchpad, a motion sensor, a trackball, a voice recognition device, a keyboard, or any other suitable input device which enables a user to interact with the computing device 200.

The output devices may include, for example, a screen and speakers. The screen may be, for example, a liquid crystal display (LCD) screen, a OLED screen, an e-ink screen, and/or any other suitable device for presenting a graphical user interface.

Figure 3:
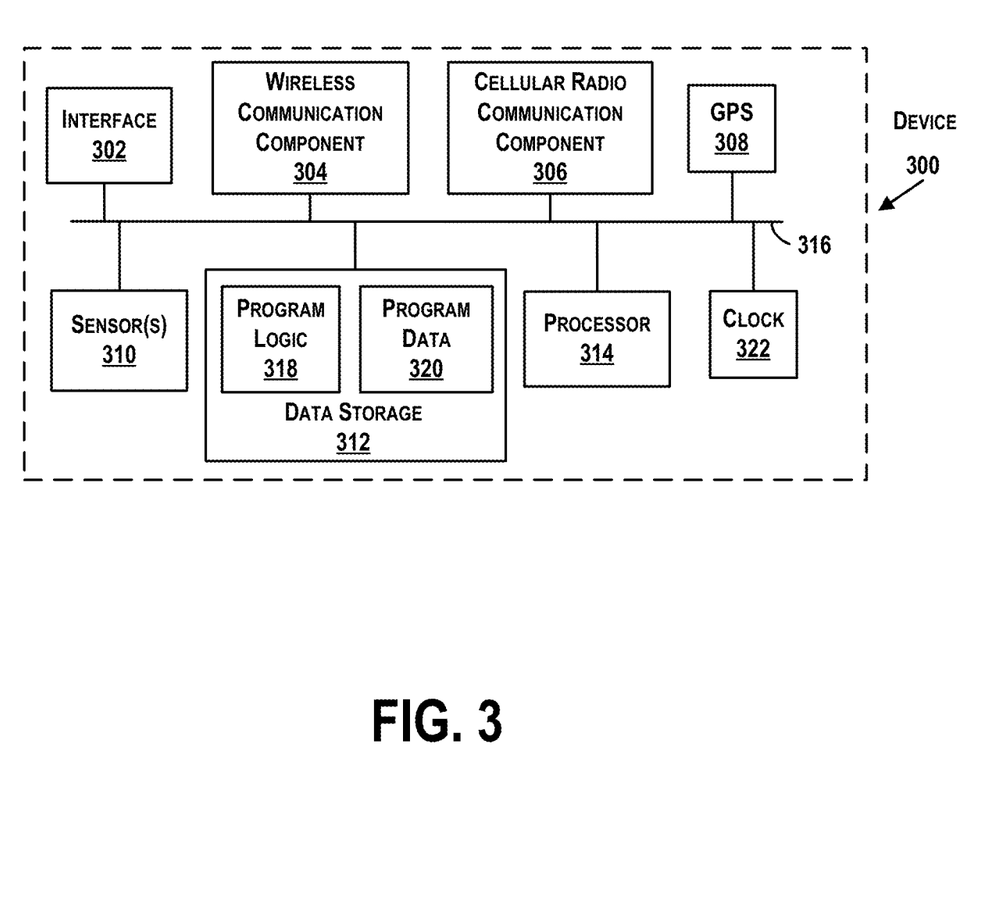
FIG. 3 is a block diagram illustrating example components of an example device.

FIG. 3 is a block diagram illustrating example components of an example device 300. In some examples, some components illustrated in FIG. 2 may be distributed across multiple computing devices. However, for the sake of example, the components are shown and described as part of one example device 300. The device 300 may be or include a mobile device, desktop computer, email/messaging device, tablet computer, or similar device that may be configured to perform the functions described herein.

In some implementations, the device 300 may include a device platform (not shown), which may be configured as a multi-layered Linux platform. The device platform may include different applications and an application framework, as well as various kernels, libraries, and runtime entities. In other examples, other formats or systems may operate the device 300 as well.

The device 300 may include an interface 302, a wireless communication component 304, a cellular radio communication component 306, a global position system (GPS) 308, sensor(s) 310, data storage 312, a processor 314, and a clock 322. Components illustrated in FIG. 3 may be linked together by a communication link 316. The device 300 may also include hardware to enable communication within the device 300 and between the device 300 and another computing device (not shown), such as a second device 300 or a wireless access point entity. The hardware may include transmitters, receivers, and antennas, for example.

The interface 302 may be configured to allow the device 300 to communicate with another computing device (not shown), such as a second computing device. Thus, the interface 212 may be configured to receive input data from one or more computing devices, and may also be configured to send output data to the one or more computing devices. The interface 212 may also include a receiver and transmitter to receive and send data. In other examples, the interface 212 may also include a user-interface, such as a keyboard, microphone, touchscreen, etc., to receive inputs as well.

The wireless communication component 304 may be a communication interface that is configured to facilitate wireless data communication for the device 300 according to one or more wireless communication standards. For example, the wireless communication component 304 may include a Wi-Fi communication component that is configured to facilitate wireless data communication according to one or more IEEE 802.11 standards. As another example, the wireless communication component 304 may include a Bluetooth communication component that is configured to facilitate wireless data communication according to one or more Bluetooth standards. Other examples are also possible.

The cellular radio component 306 may be a communication interface that is configured to facilitate wireless data communication according to one or one cellular radio standards. For example, the cellular radio component 306 may include a cellular radio that is configured to facilitate wireless data communication according to one or more cellular standards, such as the Global System for Mobile Communications (GSM), Code Division Multiple Access, Long-Term Evolution (LTE), Worldwide Interoperability for Microwave Access (WiMax), among others.

The sensor 310 may include one or more sensors, or may represent one or more sensors included within the device 300. Example sensors include an accelerometer, gyroscope, pedometer, light sensors, microphone, camera, or other location and/or context-aware sensors.

The data storage 312 may store program logic 318 that can be accessed and executed by the processor 314. The data storage 312 may also store program data 320 that may include timestamp data generated in association with the wireless communication component 304 or the cellular radio communication component 306, for instance.

The communication link 316 is illustrated as a wired connection; however, wireless connections may also be used. For example, the communication link 316 may be a wired serial bus such as a universal serial bus or a parallel bus, or a wireless connection using, e.g., short-range wireless radio technology, communication protocols described in IEEE 802.11 (including any IEEE 802.11 revisions), or cellular technology, among other possibilities.

The device 300 is illustrated to include a clock 322. The clock 322 may be synchronized to the clocks of other devices, such as those in communication with device 300 via interface 302, wireless communication 304, and/or cellular radio communication component 306. Clock 322 may also be referred to as a timer.

Figure 4:
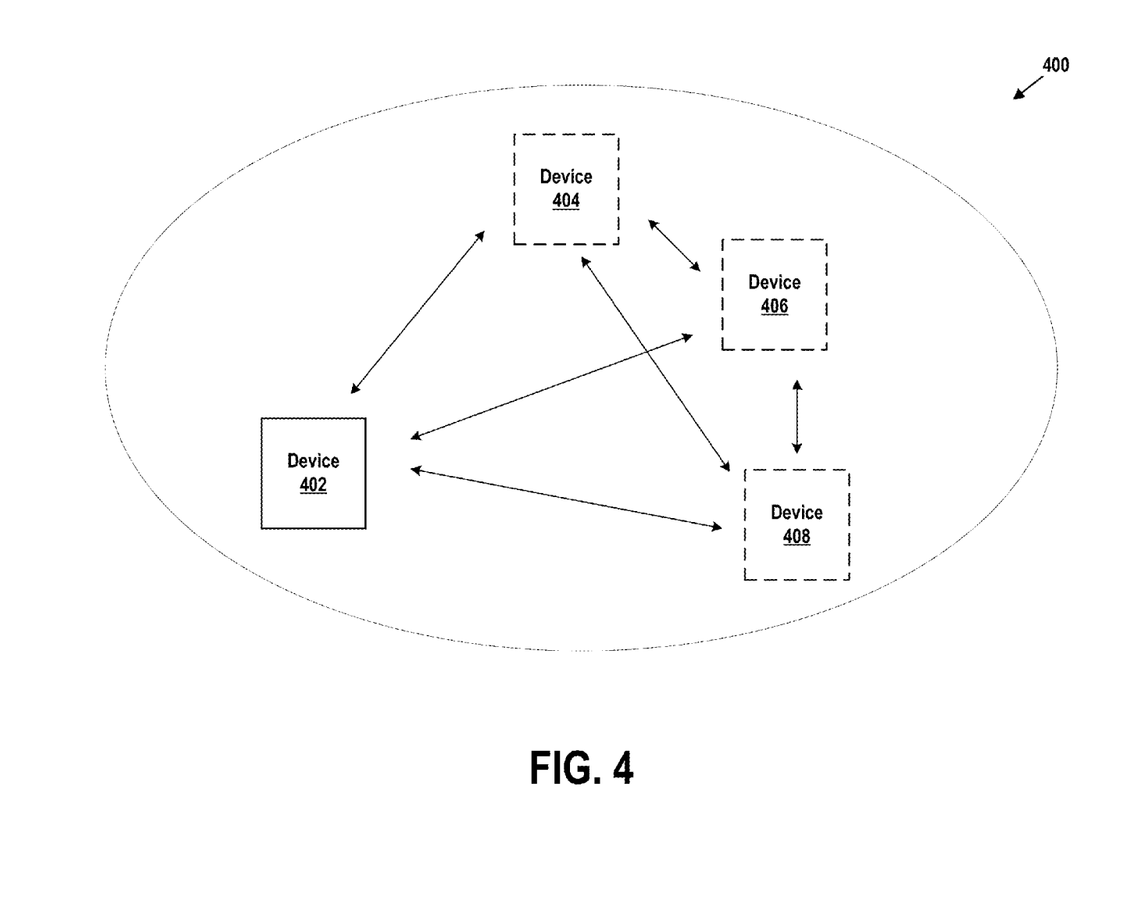
FIG. 4 illustrates example computing devices in a Neighbor Aware Network cluster.

FIG. 4 illustrates an example Neighbor Aware Networking cluster 400 in which the present method may be implemented. Neighbor Aware Networking (NAN) is a Wi-Fi standard that defines a protocol for device-to-device wireless communication. NAN cluster 400 includes device 402 and may additionally include or more of devices 404, 406, and 408. Each NAN device may communicate directly (i.e. device-to-device) with other NAN devices in the cluster. To facilitate device-to-device communication, the protocol provides a mechanism for NAN devices to converge during particular time periods known as NAN Discovery Windows. During a NAN Discovery Window, NAN devices are configured to operate on the same channel, which allow communication among the devices. NAN devices may support one or more services, and may transmit messages (known as frames) indicating the availability of their services during the NAN Discovery Window. The types of services supported by NAN devices may vary.

Within the protocol defined by Neighbor Aware Networking, a NAN network may include NAN devices that are configured to share a common set of NAN parameters. These parameters may include (1) the time period between consecutive Discovery Windows, (2) the time duration of the Discovery Windows, (3) the Synchronization Beacon interval, and (4) the NAN Channel(s). A NAN cluster may then include NAN devices that share these parameters and are synchronized to the same Discovery Window schedule. NAN Discovery Windows may repeat periodically, such as after every 512 Time Units (TU)s and last for a particular length of time, such as 16 TUs. Time Units may correspond to clock cycles of a common clock to which NAN devices participating in a NAN cluster are synchronized. During Discovery Windows, one or more NAN devices may transmit Synchronization Beacon frames to assist NAN devices in the NAN cluster synchronize their respective clocks, such that each clock is common to other clocks of other devices in the NAN cluster. The one or more NAN devices may transmit Synchronization Beacon frames periodically (i.e. after the elapse of a particular Synchronization Beacon interval). Between Discovery Windows, one more NAN devices may transmit Discovery Beacon frames to facilitate discovery of the NAN cluster.

Since NAN devices of a NAN cluster are configured to use the NAN Channel(s), they may receive the transmitted frames and discover the NAN cluster. NAN networks typically operate on a single channel in each frequency band (e.g. channel 6 in the 2.4 GigaHertz (Ghz) band and channel 44 or 149 in the 5 Ghz band, depending on the applicable regulatory domain). The NAN cluster may operate on a particular frequency band based on the frequencies supported by the NAN devices. For instance, some devices may support the 2.4 Ghz frequency band, while others may support the 2.4 and 5 Ghz bands.

NAN devices may include Wi-Fi enabled devices that are configured to support Neighbor Aware Networking Some implementation of NAN may assume NAN devices are configured according to an 802.11 certification, such as 802.11n or 801.11 ac. Computing devices 102 and 104 in FIG. 1, device 200 in FIG. 2, and/or device 300 in FIG. 3 may be NAN devices.

NAN devices may operate in a role of either Master or Non-Master. A NAN Device in a Master role may transmit both Synchronization Beacon and Discovery Beacon frames. A NAN Device in a Non-Master role may operate in a sync or non-sync state, depending on whether the NAN Device is in a NAN cluster (and is therefore synchronized to a Discovery Window schedule). Non-Master NAN devices in a sync state may transmit Synchronization Beacon frames. A NAN Device in a Master role is typically in a sync state because it creates the NAN cluster. NAN Devices may change roles and states.

As noted above, a particular NAN device may alert other NAN devices to services supported by the particular NAN device. The NAN Service Discovery Protocol defines two Service Discovery Protocol messages: Publish and Subscribe. A NAN device may use a Publish message to make a service discoverable to other NAN devices operating in the same NAN cluster. A NAN device may use a Subscribe message to ask for other NAN Devices operating in the same NAN Cluster to transmit a Publish message when certain response criteria are met. The NAN Discovery Engine, a component of the NAN device architecture, may provide Service Discovery Protocol functionality through method primitives. One method primitive provided by the NAN Discovery Engine is the Publish function, which produces Publish messages. Another method primitive provided by the NAN Discovery Engine is the Subscribe function, by which a NAN device may send a Subscribe message.

A NAN device may operate concurrently in a NAN network and in another type of Wi-Fi network such as a WLAN infrastructure network, a WLAN ad-hoc network (as known as an Independent Basic Service Set (IBSS) network), or a Wi-Fi Direct network. For instance, a NAN device may operate in a Wi-Fi infrastructure mode during the time interval between Discovery Windows.

Figure 5:
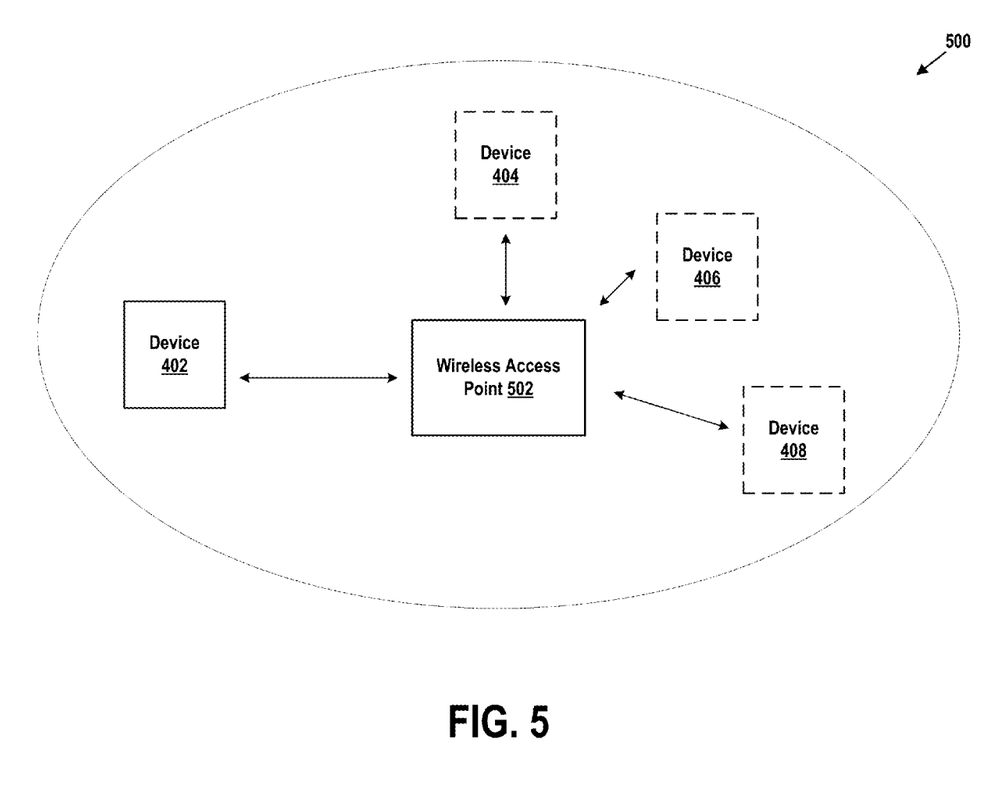
FIG. 5 illustrates example computing devices in an infrastructure mode provided by a wireless access point.

FIG. 5 illustrates an example infrastructure mode network 500 provided by a wireless access point 502. Wireless access point 502 is a device that connects wireless devices to a network, such as network 500, using Wi-Fi or a related standard. A wireless access point usually connects to a router (possibly via a wired network), but may also be implemented as a component of a router. Network 500 includes device 402 and may additionally include or more of devices 404, 406, and 408. Device 402 may communicate with one or more of devices 404, 406, and 408 via the wireless access point 502. Devices 402, 404, 406, or 408 may operate concurrently in NAN cluster 400 and network 500. For instance, device 402 may operate in NAN cluster 400 during NAN Discovery Windows of NAN cluster 400 and may operate in network 500 during time periods that occur outside of the NAN Discovery Windows of NAN cluster 400.

Figure 6:
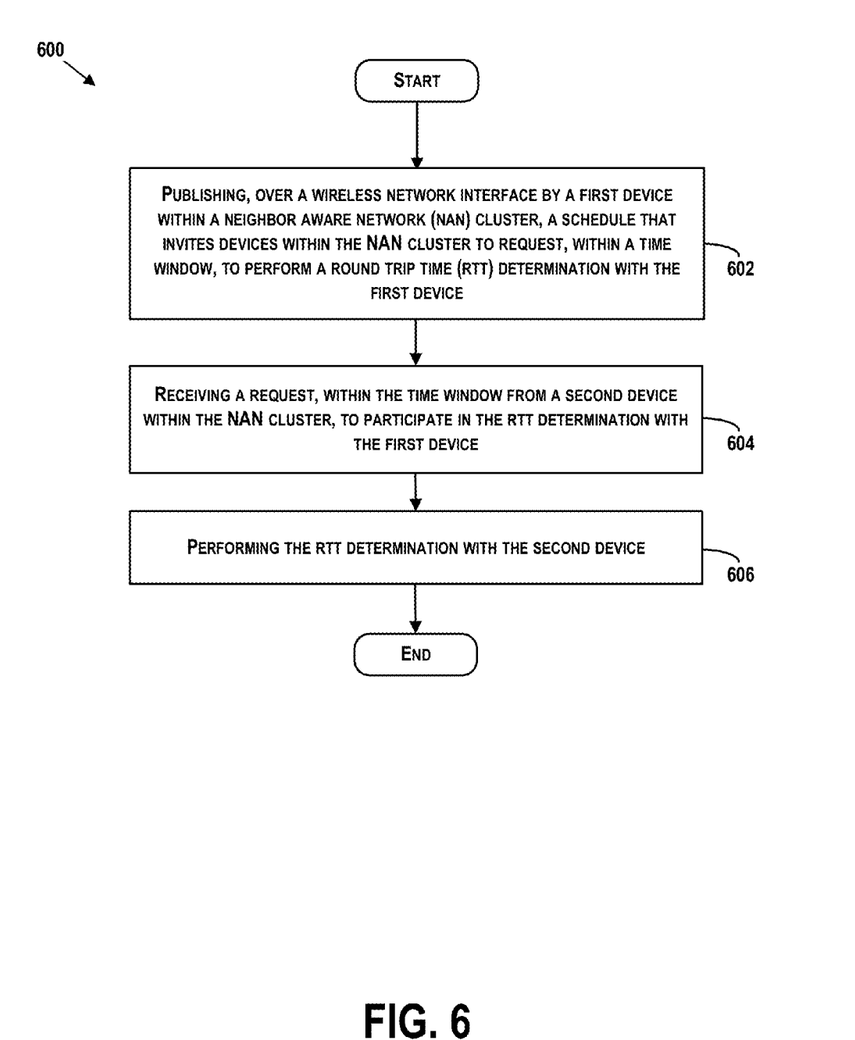
FIG. 6 is a flowchart illustrating an example method for determining round trip time.

FIG. 6 is next a block diagram of an example method 600 for performing an RTT determination, in accordance with at least some embodiments described herein. Method 600 shown in FIG. 6 presents an embodiment of a method that, for example, could be used with a computing device. Method 600 may include one or more operations, functions, or actions as illustrated by one or more blocks of 602-606. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 600 and other processes and methods disclosed herein, each block in FIG. 6 may represent circuitry that is wired to perform the specific logical functions in the process.

Functions of the method 600 may be fully performed by a processor of a computing device, or may be distributed across multiple components of a computing device. In some examples, the computing device may receive information from a network interface of the computing device.

At block 602, the method 600 includes publishing, over a wireless network interface by a first device within a neighbor aware network (NAN) cluster, a schedule that invites devices within the NAN cluster to request, within a time window, to perform a round trip time (RTT) determination with the first device. The schedule may indicate that the time window begins at a time offset from a NAN discovery window and ends after a predetermined period of time has elapsed. For instance, referring to FIG. 4, device 402 may publish a schedule that invites one or more of devices 404, 406, and 408 to request to perform a round trip time (RTT) determination with the first device. Device 402 may publish the schedule over a network interface, such as a network interface of wireless communication component 304 in FIG. 3. The network interface may be a wireless local area network (WLAN) interface, which may conform to an IEEE 802.11 standard.

Within examples, publishing the schedule may involve sending a NAN publish message to devices within a NAN cluster. As noted above, the NAN Service Discovery Protocol may define a Publish message. A NAN device may then use a Publish message to make a service discoverable to other NAN devices operating in the same NAN cluster. NAN Service Discovery Protocol messages, such as Publish messages, may be carried in NAN Service Discovery frames. Each Service Discovery frame may include zero or more Publish messages and zero or more Subscribe messages. A NAN device may broadcast Service Discovery frames to NAN devices in a NAN cluster. Also as noted above, the NAN Discovery Engine may provide Publish and Subscribe functions. By executing the Publish function, the first NAN device may cause a WLAN network interface to broadcast Service Discovery frames containing a Publish message that indicates the schedule.

The first device may publish the schedule during a Discovery Window. As noted above, NAN devices properly operating in the NAN cluster may configure themselves to communicate on the NAN channel during the NAN Discovery Window. Therefore, these NAN devices may receive the schedule when published by the first device. In other embodiments, the first device may coordinate with the other NAN devices to converge on a different time window other than the Discovery Window. The first device may then publish the schedule during the coordinated time window.

Also during the Discovery Window, the first device may synchronize its clock to the clocks of other devices within the NAN cluster. In some examples, the first device may send and/or receive a synchronization beacon to facilitate clock synchronization. As noted above, during Discovery Windows, one or more NAN devices may transmit Synchronization Beacon frames to assist NAN devices in the NAN cluster synchronize their respective clocks, such that each clock is common to other clocks of other devices in the NAN cluster. For example, Synchronization Beacon frames may indicate a timer value and NAN devices within the cluster may adopt the timer value on their respective clock to synchronize their clocks with the clocks of other NAN devices in the cluster.

NAN devices may have NAN Interface Addresses that conform to the 802.11 standard. For instance, the NAN Interface Address may be a 48-bit media access control (MAC) address that is assigned to the network interface of the device. In some cases, broadcasted Service Discovery frames may use the address FF:FF:FF:FF:FF:FF to address each computer in the NAN cluster. However, broadcasted Service Discovery frames may use any suitable broadcast or multi-cast address to address each computer in the NAN cluster, such as the "all-ones" IPv4 address.

In other examples, publishing the schedule may involve sending a Bluetooth publication to the devices within the NAN cluster. A network interface of the first device may include a Bluetooth-compliant interface. For instance, device 402 may have a Bluetooth-compliant interface and send, via that interface, a Bluetooth message that indicates the schedule to one or more of devices 404, 406, or 408 in NAN cluster 400. The Bluetooth message, or publication, may indicate a NAN interface address of the first device. Then, devices receiving the message may respond to the Bluetooth message over a Wi-Fi interface.

In further examples, publishing the schedule may involve sending a message that indicates the schedule to one or more Wi-Fi enabled devices. For instance, a first device may address each of the one or more Wi-Fi enabled devices individually and send a respective message to each of the one or more Wi-Fi enabled devices. The first device may address the one or more Wi-Fi enabled devices using any suitable address of the Wi-Fi enabled devices, such as an IPv4, IPv6, or MAC address, among other examples.

In some cases, first device may publish the schedule based on an expectation that the devices in the NAN cluster may desire to perform an RTT determination with the first device. In one example, the first device may receive a message requesting publication of the schedule. Such a message may be a NAN Subscribe message that requests publication of the schedule. As noted above, the NAN Service Discovery Protocol may define a Subscribe message. NAN devices may send Subscribe messages to ask for other NAN Devices operating in the same NAN Cluster to transmit a Publish message when certain response criteria are met. In FIG. 4, devices 404, 406, or 408 of NAN cluster 400 may send a Subscribe message to device 402 that requests device 402 to publish a schedule. After receiving the response, the device 402 may then take an action, such as publishing the schedule or determining one or more parameters of the time window, among other examples. Alternatively, the first device may receive a message that requests publication of the schedule via Bluetooth.

As noted above, the schedule may indicate that the time window begins at a time offset from a NAN discovery window. The time offset may last for a time duration measured from a particular point in time during the NAN Discovery Window (such as the beginning or the end of the Window) to the beginning of the time window. As noted above, the duration of Discovery Windows may be measured in Time Units, which may correspond to clock cycles of a common clock to which NAN devices participating in a NAN cluster are synchronized. The time duration of the time offset may vary. Further, the first device may determine the time duration of the time offset based on one or more parameters. For instance, device 402 may determine the time duration of the time offset based on the number of NAN devices in the cluster, the expected propagation time of the published schedule, the expected time to receive a response from one or more of devices 404, 406, and 408, and/or the NAN channel, or the expected time to calculate an instance an RTT algorithm, among other example parameters. Each of the example parameters in turn may vary based on one or more external or internal factors. For instance, the expected time to receive a response may vary according to the amount of electromagnetic noise in the environment in which devices 402, 404, 406, and/or 408 are operating. As noted above, the NAN channel may vary based on which frequency range the NAN network (and the NAN cluster) is operating, which may in turn depend upon the supported frequencies of the devices (e.g., 2.4 Ghz and/or 5 Ghz).

As also noted above, the schedule may indicate that the time window ends after a predetermined period of time has elapsed. Therefore, the time window may last for a time duration measured from the start of the time window to when the predetermined period of time has elapsed. The time duration of the time window may vary. Further, the first device may determine the time duration of the time window based on one or more parameters. For instance, device 402 may determine the time duration of the time window based on the number of NAN devices in the cluster, the number of received Subscribe messages, and/or the expected time to perform a RTT determination, among other example parameters.

In some cases, before the time window starts, the method may involve re-configuring the first device. As noted above, devices may operate concurrently within a NAN cluster and in another Wi-Fi network. For example, device 402 may operate within NAN cluster 400 during the NAN Discovery Window and during the time window indicated in the schedule. Then, outside of those windows, device 402 may operate in another Wi-Fi network, such as network 500. Alternatively, outside of the afore-mentioned windows, such as during the time offset, device 402 may enable a sleep-mode on its wireless network interface. The sleep mode may involve disabling the network interface or certain components of the network interface.

At block 604, the method 600 includes receiving a request, within the time window from a second device within the NAN cluster, to perform the RTT determination with the first device. For instance, referring to FIG. 4, device 402 may receive a request from devices 404 (and/or devices 406 and 408) to perform the RTT determination with device 402. Device 402 may receive the request over a network interface, such as the network interface of wireless communication component 304 in FIG. 3.

A device within NAN cluster 400 (e.g. device 404) may respond in various ways to receiving the published schedule. For example, device 404 may respond by sending a request to the first device (e.g. device 402) to perform the RTT determination. Alternatively, device 404 may respond by determining whether a RTT determination is requested by an application executing on device 404. If so, device 404 may respond by sending the request to the device 402 to perform the RTT determination. If not, device 404 may respond in a different manner, such as by not sending the request to the device 402 to perform the RTT determination.

At block 606, the method 600 includes performing the RTT determination with the second device. Device 402 may perform RTT determinations with each device from which it received a request to perform the RTT determination. For instance, device 402 may perform an RTT determination with device 404 (and/or with device 408 and device 408). Further, device 402 may perform the RTT determinations fully within the time window or, alternatively, device 402 may initiate the RTT determinations within the time window.

Within examples, performing the RTT determination may involve a variety of functions. For instance, the first device may send a first message to the second device and then receive a second message from the second device. The first device may then measure the length of the time that elapsed from sending the first message until receiving the second message. The first device may then base the RTT on the measured length of time. In some examples, performing the RTT determination involves invoking the RTT protocol defined by the 802.11 standard (currently referred to as RTT3).

Figure 7:
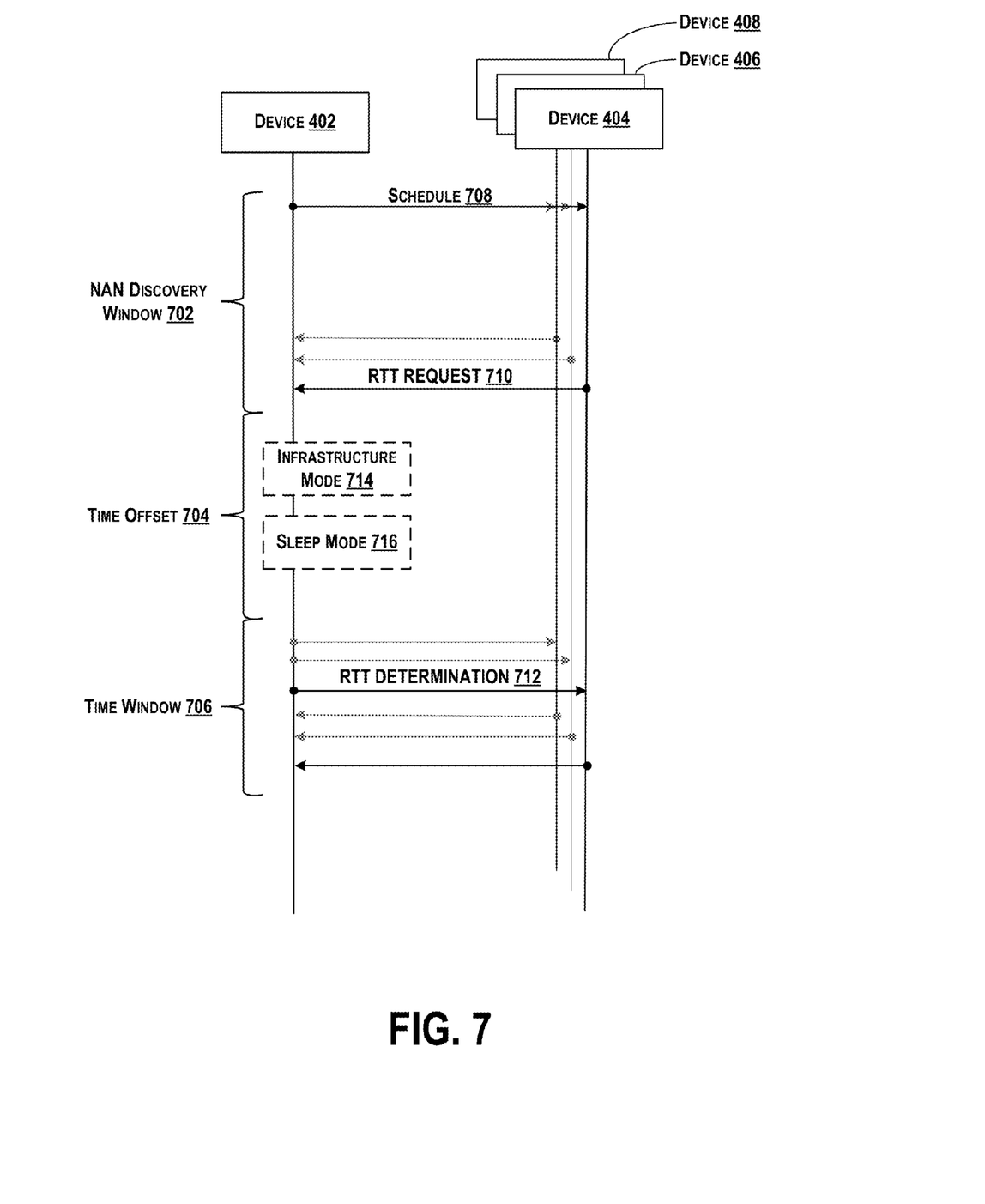
FIG. 7 is an example timing diagram conceptually illustrating performing an RTT determination via a Neighbor Aware Network.

FIG. 7 is an example timing diagram illustrating an example embodiment of the present method. During NAN Discovery Window 702, device 402 of FIG. 4 may publish to devices 404, 406, and/or 408 a schedule 708. As noted above, the schedule 708 invites devices within the NAN cluster to request, within a time window, to perform a round trip time (RTT) determination with device 402. Then, after device 402 publishes the schedule 708 and during NAN Discovery Window 702, device 402 receives an RTT request(s) 710 from devices 404, 406, and/or 408. The RTT request(s) 710 ask device 402 to perform an RTT determination with the sending device(s). During the time offset 704, device 402 may optionally operate in a different network or mode, such as in infrastructure mode 714 (which may involve operating in network 500, for instance) or in sleep mode 716. Then, during time window 706, device 402 may perform RTT determinations 812 with one or more of devices 404, 406, and/or 408. Each RTT determination may involve sending a respective first message to one of device 404, 406, or 408 and then receiving a respective second message from devices 404, 406, or 408.

Figure 8:
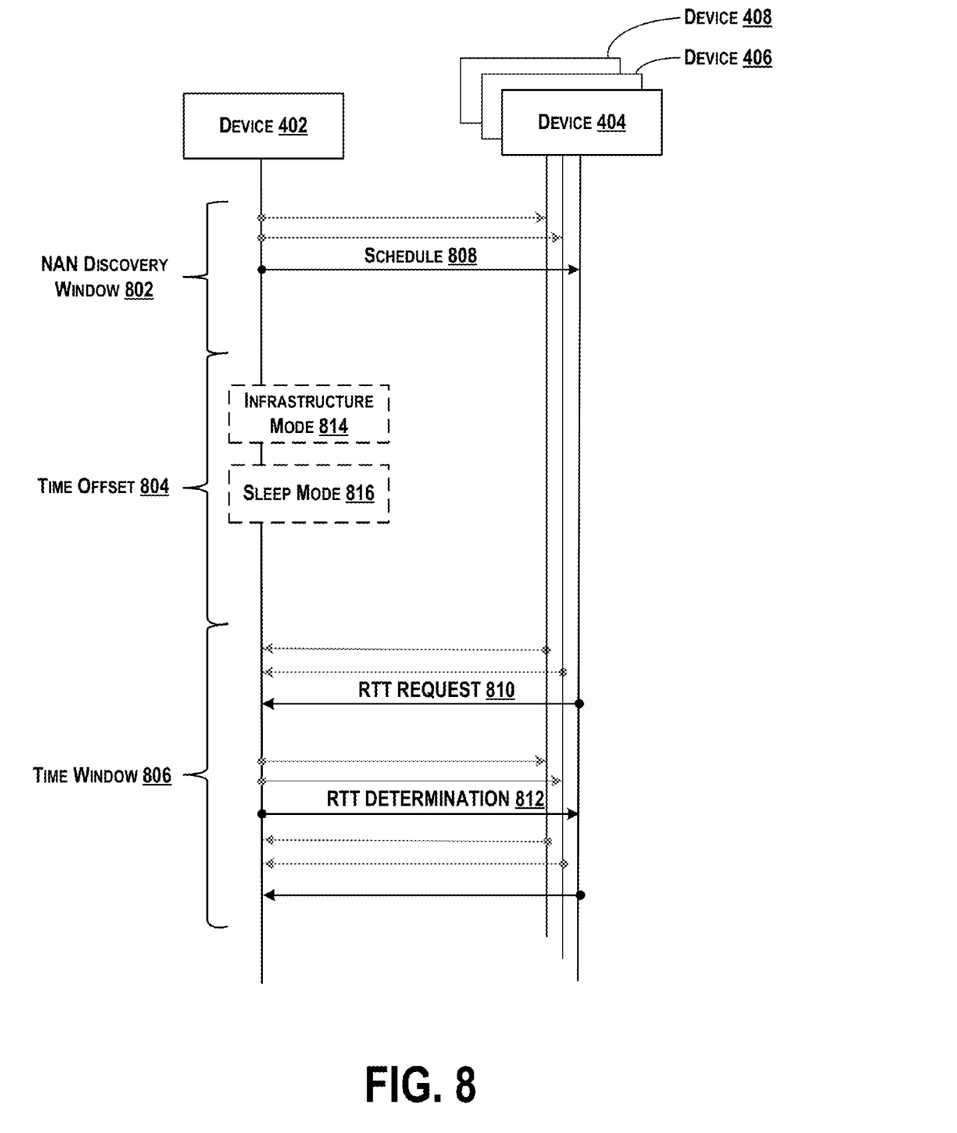
FIG. 8 is another example timing diagram conceptually illustrating performing an RTT determination via a Neighbor Aware Network.

FIG. 8 is another example timing diagram illustrating another example embodiment of the present method. During NAN Discovery Window 802, device 402 of FIG. 4 may publish to devices 404, 406, and/or 408 a schedule 808. As noted above, the schedule 808 invites devices within the NAN cluster to request, within a time window, to perform a round trip time (RTT) determination with device 402. During the time offset 804, device 402 may optionally operate in a different network or mode, such as in infrastructure mode 814 (which may involve operating in network 500, for instance) or in sleep mode 816. Then, during time window 806, device 402 receives an RTT request 810 from devices 404, 406, and/or 408. The RTT request(s) 810 ask device 402 to perform an RTT determination with the sending device(s). After receiving the RTT request 810, device 402 may perform an RTT determination 812 with one or more of devices 404, 406, and/or 408. Each RTT determination may involve sending a respective first message to one of device 404, 406, or 408 and then receiving a respective second message from devices 404, 406, or 408.

Within examples, the first and second messages may be an echo request message and an echo message, respectively. An echo request message may cause the receiving device to send an echo to the sender of the echo request message. The echo request message may indicate the sending device, such as by indicating the NAN interface address of the sender. The Internet Control Message Protocol (ICMP) defines specific types of echo and echo request messages. Within examples the first device may send the IMCP echo request message and receive an IMCP echo request message in response.

To facilitate performing the RTT determination, the first device may generate timestamps in conjunction with sending and receiving the first and second messages. For instance, device 402 may send an echo request message to device 404. Device 402 may also generate a first time stamp that indicates the time at which the echo request message was sent. The first time stamp may be based upon a clock, such as clock 322 in FIG. 3, which is synchronized to the clocks of other devices within NAN cluster 400. Device 402 may then determine the RTT based on the first time stamp and the second time stamp. For instance, device 402 may determine the difference in time between the first time stamp and the second time stamp as the RTT.

Figure 9:
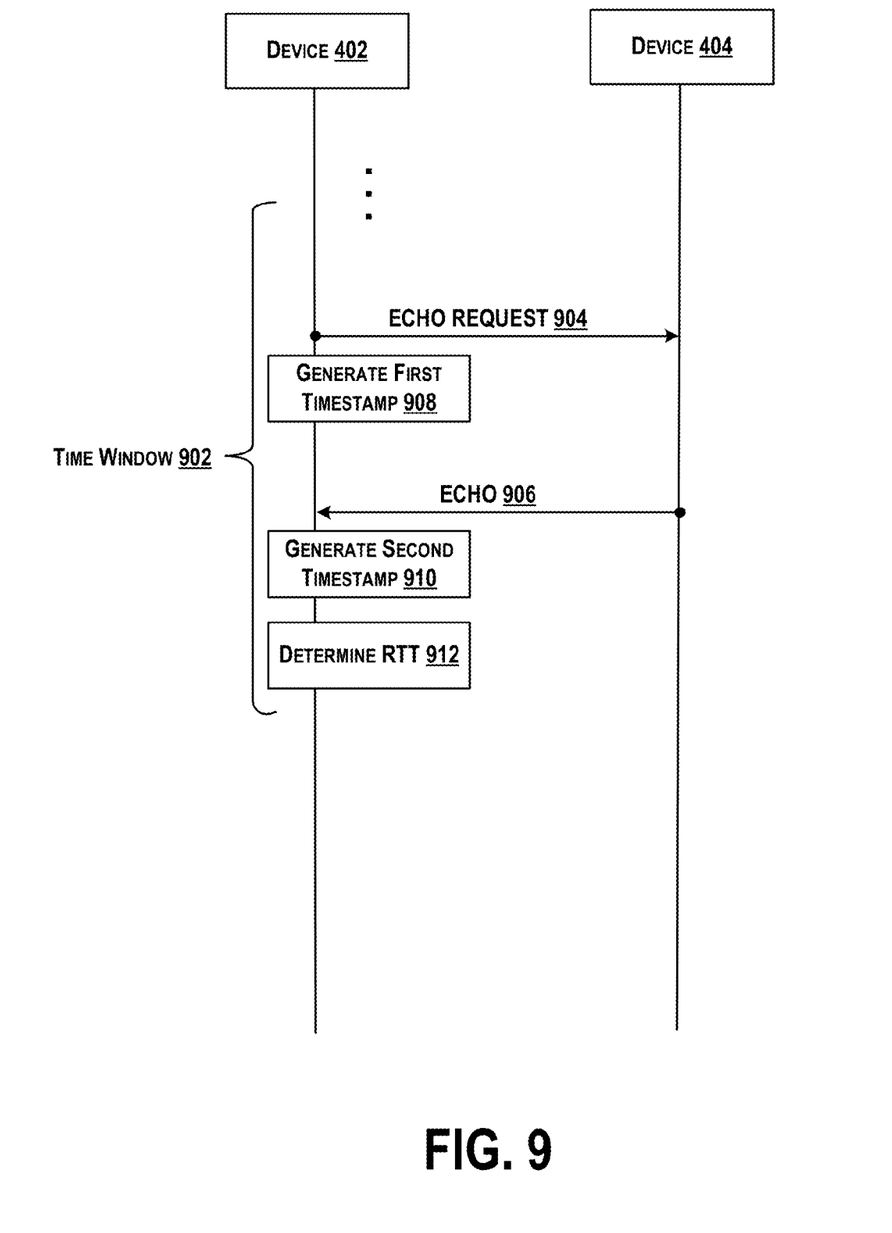
FIG. 9 is yet another example timing diagram conceptually illustrating aspects of performing an RTT determination via a Neighbor Aware Network.

FIG. 9 is an example timing diagram illustrating example aspects of performing an RTT determination. The RTT determination is performed during a time window 902, which may follow a time offset from a NAN Discovery Window. During the time window 902, device 402 may send an echo request 904 to device 404. Device 402 may also generate a first timestamp 908 that may indicate at which time during time window 902 that echo request 904 was sent. Device 402 may receive echo 906 in reply to the echo request 904 from device 404. Device 402 may generate a second timestamp 910 that may indicate at which time during time window 902 that echo 906 was received. Device 402 may then determine the RTT 912 between sending the echo request 904 and sending the echo 906.

In some examples, the first device may determine a geographic distance from the first device to the second device based on the performed RTT determination. For instance, device 402 may determine a geographic distance to device 404. The first device may further base the determination of the geographic distance in part on the propagation speed of sending and receiving the first and second messages (i.e. the speed of light). Then, for example, the geographic distance may be proportional to the RTT.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising: publishing, over a wireless network interface by a first device within a neighbor aware network (NAN) cluster, a schedule that invites devices within the NAN cluster to request, within a time window, to perform a round trip time (RTT) determination with the first device, wherein the schedule indicates that the time window begins at a time offset from a NAN discovery window and ends after a predetermined period of time has elapsed, wherein the NAN cluster is operating on a wireless local area network (WLAN) channel;
the first device operating, during the time window, in a WLAN infrastructure mode in which the first device is connected to a wireless access point;
receiving a NAN synchronization frame during the NAN discovery window that indicates a timer value, the timer value enabling the devices within the NAN cluster to synchronize respective clocks;
receiving a request, within the time window from a second device within the NAN cluster, to perform the RTT determination with the first device;
based on receiving the request within the time window, performing fully within the time window the RTT determination with the second device that is also within the NAN cluster, wherein performing the RTT determination comprises:
sending an echo request message to the second device;
generating, based on a timer that is synchronized to the NAN cluster and adjusted based on the time value, a first time stamp that indicates a time at which the echo request message was sent;
receiving an echo message;
in response to receiving the echo message, generating, based on the timer, a second time stamp that indicates a time at which the echo message was received; and
determining the RTT based on the first time stamp and the second time stamp;
determining, based on the timer that is synchronized to the NAN cluster, that the time offset from the NAN discovery window has elapsed; and
responsive to the determination, transitioning from the WLAN infrastructure mode in which the first device is connected to the wireless access point to a NAN mode in which the first device is disconnected from the wireless access point and in which the device is configured to receive on the WLAN channel.

2. The method of claim 1, wherein publishing the schedule comprises:
sending a NAN publish message to the devices within the NAN cluster.

3. The method of claim 1, wherein publishing the schedule comprises:
sending a short-range wireless publication to the devices within the NAN cluster, wherein the short-range wireless publication indicates a NAN interface address of the first device.

4. The method of claim 1, wherein the schedule is published during the NAN discovery window.

5. The method of claim 1, further comprising:
receiving a NAN subscribe message that requests publication of the schedule; and
in response to receiving the NAN subscribe message, identifying the NAN discovery window.

6. The method of claim 1, further comprising:
enabling a sleep mode on the wireless network interface during the time offset.

7. The method of claim 1, further comprising:
determining a geographic distance from the first device to the second device based at least in part on the performed RTT determination.

8. A device comprising:
a wireless local area network (WLAN) interface; one or more processors; and data storage configured to store instructions, that when executed by the one or more processors, cause the device to:

send, over the WLAN interface to one or more devices within a neighbor aware network (NAN) cluster, a schedule that invites devices within the NAN cluster to request, within a time window, to perform a round trip time (RTT) determination with the first device, wherein the schedule indicates that the time window begins at a time offset from a NAN discovery window and ends after a predetermined period of time has elapsed, wherein the NAN cluster is operating on a wireless local area network (WLAN) channel;

operating, during the time window, in a WLAN infrastructure mode in which the WLAN interface is connected to a wireless access point;

receiving a NAN synchronization frame during the NAN discovery window that indicates a timer value, the timer value enabling the devices within the NAN cluster to synchronize respective clocks;

receiving, from at least one of the one or more devices, a request to perform a respective RTT determination with the first device;

based on receiving the request within the time window, performing fully within the time window RTT determinations with the at least one of the one or more devices that is also within the NAN cluster, wherein performing the RTT determination comprises:

sending an echo request message to the at least one or the one or more devices;

generating, based on a timer that is synchronized to the NAN cluster and adjusted based on the time value, a first time stamp that indicates a time at which the echo request message was sent;

receiving an echo message;

in response to receiving the echo message, generating, based on the timer, a second time stamp that indicates a time at which the echo message was received; and determining the RTT based on the first time stamp and the second time stamp;

determining, based on the timer that is synchronized to the NAN cluster, that the time offset from the NAN discovery window has elapsed; and responsive to the determination, transitioning from the WLAN infrastructure mode in which the WLAN interface is connected to the wireless access point to a NAN mode in which the WLAN interface is disconnected from the wireless access point and in which the WLAN interface is configured to receive on the WLAN channel.

9. The device of claim 8, wherein the instructions further cause the device to:

determine the predetermined period of time based at least in part on a number of devices within the NAN cluster.

10. The device of claim 8, wherein the instructions further cause the device to:

determine a geographic location of the first device based at least in part on the performed RTT determination.

11. The device of claim 8, wherein the instructions further cause the device to:

receive a NAN subscribe message that requests publication of the schedule; and in response to receiving the NAN subscribe message, identify the NAN discovery window.

12. The device of claim 8, wherein the schedule is published during the NAN discovery window.

13. The device of claim 8, wherein the instructions further cause the device to:

enable a sleep mode on the wireless network interface during the time offset.

14. A non-transitory computer readable medium having stored therein instructions, that when executed by a first device, cause the device to perform operations, the operations comprising:

publishing, over a wireless network interface by the first device within a neighbor aware network (NAN) cluster, a schedule that invites devices within the NAN cluster receiving the schedule to request, within a time window, to perform a round trip time (RTT) determination with the first device, wherein the schedule indicates that the time window begins at a particular time offset from a NAN discovery window and ends after a predetermined period of time has elapsed, wherein the NAN cluster is operating on a wireless local area network (WLAN) channel;

the first device operating, during the time window, in a WLAN infrastructure mode in which the first device is connected to a wireless access point;

receiving a NAN synchronization frame during the NAN discovery window that indicates a timer value, the timer value enabling the devices within the NAN cluster to synchronize respective clocks;

receiving a request, from a second device, to perform the RTT determination with the first device; and based on receiving the request within the time window, performing, fully within the time window, the RTT determination with the second device that is also within the NAN cluster, wherein performing the RTT determination comprises:

sending an echo request message to the second device;

generating, based on a timer that is synchronized to the NAN cluster and adjusted based on the time value, a first time stamp that indicates a time at which the echo request message was sent;

receiving an echo message;

in response to receiving the echo message, generating, based on the timer, a second time stamp that indicates a time at which the echo message was received; and determining the RTT based on the first time stamp and the second time stamp;

determining, based on the timer that is synchronized to the NAN cluster, that the time offset from the NAN discovery window has elapsed; and responsive to the determination, transitioning from the WLAN infrastructure mode in which the first device is connected to the wireless access point to a NAN mode in which the first device is disconnected from the wireless access point and in which the device is configured to receive on the WLAN channel.

15. The non-transitory computer readable medium of claim 14, wherein publishing the schedule comprises:

sending a NAN publish message to the devices within the NAN cluster.

16. The non-transitory computer readable medium of claim 14, wherein publishing the schedule comprises:

sending a short-range wireless publication to the devices within the NAN cluster, wherein the short-range wireless publication indicates a NAN interface address of the first device.

17. The non-transitory computer readable medium of claim 14, wherein the instructions further cause the device to:

determine a geographic distance from the first device to the second device based at least in part on the performed RTT determination.

\* \* \* \* \*